United States Patent
Lee et al.

(10) Patent No.: US 7,678,504 B2
(45) Date of Patent: Mar. 16, 2010

(54) LITHIUM SECONDARY BATTERY AND A METHOD FOR PREPARING THE SAME

(75) Inventors: Jin-Young Lee, Suwon (KR); Kyoung-Hee Lee, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 530 days.

(21) Appl. No.: 10/617,811

(22) Filed: Jul. 14, 2003

(65) Prior Publication Data
US 2004/0013944 A1 Jan. 22, 2004

(30) Foreign Application Priority Data
Jul. 15, 2002 (KR) .................. 10-2002-0041169

(51) Int. Cl.
*H01M 6/18* (2006.01)

(52) U.S. Cl. .................. 429/314; 429/188; 429/304
(58) Field of Classification Search .................. 429/314, 429/315; 252/62.2
See application file for complete search history.

(56) References Cited

U.S. PATENT DOCUMENTS

| 5,709,968 | A |  | 1/1998 | Shimizu |
| 5,879,834 | A |  | 3/1999 | Mao |
| 6,645,671 | B2 | * | 11/2003 | Tsutsumi et al. ............ 429/212 |
| 7,351,500 | B2 | * | 4/2008 | Ueda et al. ............. 429/231.95 |
| 2002/0177027 | A1 | * | 11/2002 | Yeager et al. .................. 429/34 |

FOREIGN PATENT DOCUMENTS

| JP | 10-112335 |  | 4/1998 |
| JP | 11-273731 | * | 10/1999 |
| JP | 2000-086711 |  | 3/2000 |
| JP | 2001-210373 |  | 8/2001 |
| JP | 2002-083633 |  | 3/2002 |
| JP | 2002-265539 |  | 9/2002 |
| KR | 10-2000-0061681 |  | 10/2000 |
| WO | WO 02/40404 | * | 5/2002 |

* cited by examiner

*Primary Examiner*—Patrick Ryan
*Assistant Examiner*—Cyntiha Lee
(74) *Attorney, Agent, or Firm*—H.C. Park & Associates, PLC

(57) ABSTRACT

A lithium secondary battery of the present invention comprises a positive electrode; a negative electrode; a separator interposed between the positive and negative electrodes; and an electrolyte on the separator, wherein the electrolyte includes a non-aqueous organic solvent, a lithium salt, and a linear polymer having P=O bonds. The electrolyte improves the swelling characteristics of lithium secondary batteries. A lithium secondary battery with the electrolyte and a method for preparing the electrolyte and battery is described.

8 Claims, 1 Drawing Sheet

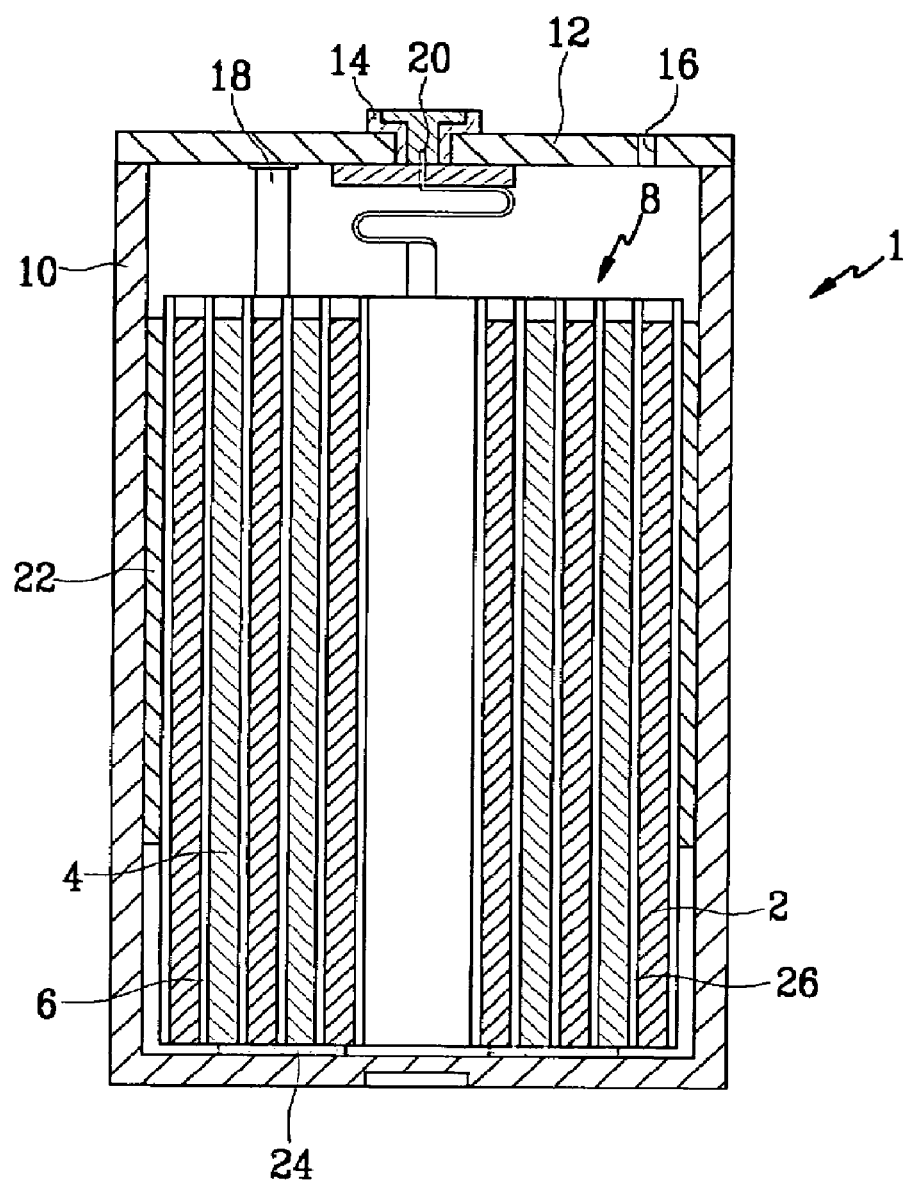

LITHIUM SECONDARY BATTERY AND A METHOD FOR PREPARING THE SAME

CROSS REFERENCE TO RELATED APPLICATION

This application is based on Korean patent application No. 2002-41169 filed in the Korean Intellectual Property Office on Jul. 15, 2002, the disclosure of which is incorporated herein by reference.

BACKGROUND OF THE INVENTION (a) Field of the Invention

The present invention relates to a lithium secondary battery, and a method of preparing the lithium secondary battery. More particularly, the present invention is directed to reducing swelling in a lithium secondary battery by using an electrolyte in accordance with the present invention.

(b) Description of the Related Art

The use of portable electronic instruments is increasing as electronic equipment gets smaller and lighter due to developments in high-tech electronic industries. Studies on lithium secondary batteries are actively being pursued in accordance with the increased need for a battery having high energy density for use as a power source in portable electronic instruments. Such a lithium secondary battery, having an average discharge potential of 3.7 V (i.e., a battery having substantially a 4 V average discharge potential) is considered to be an essential element in the digital generation since it is an indispensable energy source for portable digital devices such as cellular telephones, notebook computers, camcorders, etc. (i.e., the "3C" devices).

There has been extensive research on effective safety characteristics of batteries, such as the ability to prevent overcharge. When a battery is overcharged, an excess of lithium ions is deposited on the positive electrode, and an excess of lithium ions is inserted into the negative electrode which makes the positive and negative electrodes thermally unstable. An eruptive explosion may occur from the decomposition of the electrolytic organic solvent, and the thermal runaway that occurs causes serious safety concerns for batteries.

To overcome the above problems, it has been suggested that an aromatic compound such as an oxidation-reduction additive agent ("redox shuttle") be added to the electrolyte. For example, U.S. Pat. No. 5,709,968 discloses a non-aqueous lithium ion secondary battery to prevent thermal runaway resulting from an overcharge current by using a benzene compound such as 2,4-difluoroanisole. U.S. Pat. No. 5,879,834 discloses a method for improving battery safety by using a small amount of an aromatic compound such as biphenyl, 3-chlorothiophene, furan, etc. which is polymerized electrochemically to increase the internal resistance of a battery during unusual overvoltage conditions. Such redox shuttle additives increase the temperature inside the battery early due to heat produced by the oxidation-reduction reaction, and close pores of a separator through quick and uniform fusion of the separator to inhibit an overcharge reaction. The polymerization reaction of these redox shuttle additives consumes the overcharge current to improve battery safety.

However, the polymerization of these redox shuttle additives cannot sufficiently eliminate the overcharge current. In addition, decomposition of the additives may cause gas generation inside the battery, and thus, the battery swells. Therefore, improvements in the safety of the battery are limited when using the redox shuttle additives. Additionally, some redox shuttle additives have a deleterious effect on electrochemical properties such as high temperature or cycle life characteristics.

For solving the swelling phenomenon from gas generation inside the battery, a method has been disclosed in which the safety of a secondary battery including a non-aqueous electrolyte is improved by mounting a current breaker or a vent for ejecting the internal electrolyte solution when the internal pressure is increased above a predetermined level. However, a problem with the disclosed method is that the battery may operate incorrectly because of an increase in internal pressure itself.

Alternatively, Korean Patent Application No. 1999-10904 discloses an electrode that is subject to heat-treatment at 100 to 200° C. followed by cooling at room temperature in order to improve swelling inhibition characteristics.

SUMMARY OF THE INVENTION

To solve the problems stated above, it is an aspect of the present invention to provide a lithium secondary battery with improved swelling inhibition characteristics, and a method of preparing the battery.

To accomplish the aspects of the present invention, in certain preferred embodiments, the present invention provides a lithium secondary battery with improved swelling inhibition properties, comprising a positive electrode including a material that is capable of reversible intercalation/deintercalation of lithium ions, as a positive active material; a negative electrode including a lithium metal, a lithium-containing alloy, a material that is capable of reversible intercalation/deintercalation of lithium ions, or a material that is capable of reversibly forming a lithium-containing compound as a negative active material; a separator interposed between the positive and negative electrodes; and an electrolyte including a non-aqueous organic solvent, a lithium salt, and a linear polymer having $P=O$ bonds.

The present invention further provides a method of manufacturing a lithium secondary battery, comprising preparing a lithium secondary battery by injecting a non-aqueous electrolyte comprising a lithium salt, a non-aqueous organic solvent, a phosphonate compound with an unsaturated hydrocarbon group, and a polymerization initiator between positive and negative electrodes; and preparing a linear polymer with $P=O$ bonds by reacting a phosphonate compound with an unsaturated hydrocarbon group.

Other features and/or advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawing, which is incorporated in and constitutes a part of the specification, illustrates an embodiment of the invention, and together with the description serves to explain the principles of the invention.

FIG. 1 is a cross-sectional view of a lithium secondary battery cell.

DETAILED DESCRIPTION OF THE PREFERRED EMBODIMENTS

In the following detailed description, the following embodiments of the invention have been shown and described, by way of illustrating the best mode contemplated by the inventors of carrying out the invention. As will be realized, the invention is capable of modification in various respects, all without departing from the invention. Accordingly, the drawing and description are to be regarded as illustrative in nature, and not limiting in any respect.

A cross-sectional view of a general non-aqueous Li-ion cell is shown in FIG. 1. The Li-ion cell 1 is fabricated by inserting an electrode assembly 8 including a positive electrode 2, a negative electrode 4, and a separator 6 between the positive and negative electrodes into a battery case 10. An electrolyte 26 is injected into the battery case 10 and impregnated into the separator 6. The upper part of the case 10 is sealed with a cap plate 12 and a sealing gasket 14. The cap plate 12 has a safety vent 16 to release pressure. A positive electrode tab 18 and a negative electrode tab 20 are respectively attached on the positive electrode 2 and the negative electrode 4. Insulators 22 and 24 are installed on the lower part and the side part of the electrode assembly 8 to prevent a short circuit in the battery.

A lithium secondary battery in accordance with a certain embodiment of present invention comprises a positive electrode including a material that is capable of reversible intercalation/deintercalation of lithium ions as a positive active material; a negative electrode including a lithium metal, a lithium-containing alloy, a material that is capable of reversible intercalation/deintercalation of lithium ions, or a material that is capable of reversibly forming a lithium-containing compound as a negative active material; a separator interposed between the positive and negative electrodes; and an electrolyte on the separator where the electrolyte including a non-aqueous organic solvent, a lithium salt, and a linear polymer having P=O bonds.

Examples of the positive active material may include, but are not limited to, a complex metal oxide such as $LiMn_2O_4$, $LiCoO_2$, $LiNiO_2$, $LiFeO_2$, $V_2O_5$, or other similar metal oxides; a sulfide compound such as TiS, MoS, or other similar sulfides; an organic disulfide compound; an organic polysulfide compound; or other material suitable for a positive active material.

A material that is capable of reversible intercalation/deintercalation of lithium ions as a negative active material may include, but is not limited to a carbonaceous material, such as artificial graphite, natural graphite, graphitized carbon fiber, and amorphous carbon. Also, other conventional materials known to those skilled in the art that have been used as positive and negative materials of lithium batteries may be used as positive and negative materials of the battery of the present invention.

In certain embodiments, the separator interposed between the positive and negative electrodes may be a polyethylene, polypropylene, or polyvinylidene fluoride monolayered separator; a polyethylene/polypropylene double layered separator; a polyethylene/polypropylene/polyethylene three layered separator; or a polypropylene/polyethylene/polypropylene three layered separator, or other suitable separator known to those skilled in the art.

In certain preferred embodiments, the electrolyte in the present invention includes a non-aqueous organic solvent, a lithium salt, and a linear polymer having P=O bonds.

The non-aqueous organic solvent may include, but is not limited to, a carbonate, an ester, an ether, or a ketone. Examples of carbonates may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC) and other suitable carbonates. Examples of esters may include γ-butyrolactone (γ-BL), n-methyl acetate, n-ethyl acetate, n-propyl acetate, and other suitable esters. Examples of ethers may include dibutyl ether, and other suitable ethers. However, the non-aqueous organic solvent is not limited to the above solvents.

It is preferable to use a mixture of a linear carbonate and a cyclic carbonate. The cyclic carbonate and the linear carbonate are preferably mixed together in a volume ratio ranging from about 1:1 to about 1:9 cyclic carbonate to linear carbonate. Examples of cyclic carbonates include, but are not limited to ethylene carbonate (EC), propylene carbonate (PC), and butylene carbonate (BC). When the cyclic carbonate and the linear carbonate are mixed in the volume ratio of about 1:1 to about 1:9, and the mixture is used as an electrolyte, the electrolyte performance may be enhanced.

In addition, the electrolyte of the present invention may further include mixtures of the carbonate solvents and aromatic hydrocarbon solvents of Formula (1):

(1)

where R is a hydrogen, halogen, or a $C_1$ to about a $C_{10}$ alkyl, and p is an integer of 1 to about 6.

Examples of aromatic hydrocarbon solvents include benzene, chlorobenzene, nitrobenzene, fluorobenzene, toluene, fluorotoluene, trifluorotoluene, xylene, or other suitable aromatic solvent.

The carbonate solvents and the aromatic hydrocarbon solvents are preferably mixed together in a volume ratio ranging from about 1:1 to about 30:1 carbonate solvent to aromatic hydrocarbon solvent. Electrolyte performance may be enhanced when the carbonate solvent and the aromatic hydrocarbon solvent are mixed with each other in this volume ratio, and the mixture is used as an electrolyte. The non-aqueous organic solvent plays a role of a medium wherein ions capable of participating in the electrochemical reaction are mobilized.

The lithium salt may be a lithium salt known by those skilled in the art suitable for lithium secondary batteries. The lithium salt may include at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

The concentration of the lithium salt preferably ranges from about 0.6 to about 2.0M. When the concentration of the lithium salt is less than about 0.6M, the electrolyte performance deteriorates due to its lack of ionic conductivity. When the concentration of the lithium salt is greater than about 2.0M, the lithium ion mobility deteriorates due to an increase of the electrolyte viscosity, and low temperature performance also deteriorates. The lithium salt acts as a supply source of lithium ions in a battery, making the basic operation of a lithium secondary battery possible.

The linear polymer having P=O bonds improves swelling inhibition properties of the battery at high temperatures, and the P=O bonds in the polymer enhance flame-retardant properties of the battery resulting in improvement of safety. As understood herein, the linear polymer having P=O bonds also includes appropriate resonance structures for the P=O bond.

The linear polymer having P=O bonds is formed by polymerizing a phosphonate compound with a polymerizable functional unsaturated hydrocarbon group. The unsaturated hydrocarbon group may include, but is not limited to, $C_2$ to $C_{20}$ alkenyls, alkynyls, etc., preferably vinyl, silyl, siloxy, etc. Preferred examples of the phosphonate compound with an unsaturated hydrocarbon group may include diethyl vinyl phosphonate, dimethyl vinyl phosphonate, dipropyl vinyl phosphonate, allyl diethylphosphonoacetate ($(C_2H_5O)_2P(O)CH_2CO_2CH_2CH=CH_2$), triethyl 3-methyl-4-phosphonocrotonate ($(C_2H_5O)_2P(O)CH_2C(CH_3)=CHCO_2C_2H_5$), allyl tetraisopropylphosphonodiamidate ($[[CH_3)_2CH]_2N]_2POCH_2CH=CH_2$), and other suitable phosphonate compounds.

The linear polymer having P=O bonds is preferably present in an amount ranging from about 0.005 to about 5 wt % based on the total amount of the electrolyte. The preferable effect of the linear polymer is not likely to occur when the polymer is present in an amount of less than about 0.005 wt %, and battery performance such as capacity characteristics deteriorates when the polymer exists in an amount exceeding 5 wt %.

The linear polymer having P=O bonds enhances swelling inhibition properties of the battery and helps to form a protective layer on the electrodes. The organic protective layer formed on the electrodes inhibits a side reaction of lithium ions during a charge-discharge cycle to maintain the amount of reversibly intercalating lithium ions.

A lithium secondary battery in accordance with an embodiment of the present invention is fabricated by the following process. Positive and negative electrodes are fabricated by coating a slurry including active materials on a current collector of an appropriate thickness and length. An electrode assembly is prepared by winding or laminating a positive electrode, a negative electrode, and a porous insulating film interposed between the positive and negative electrodes, then placing the electrode assembly into a battery case. An electrolyte of the present invention is injected into the case, and the upper part of the battery case is sealed.

The positive electrode is fabricated by mixing a positive active material, a binder, and a conductive agent and coating it on a current collector such as a metal foil or a metal net and forming it into a sheet shape. The negative electrode is fabricated by mixing a negative active material, a binder, and optionally a conductive agent and coating it on a current collector such as a metal foil or a metal net and forming it into a sheet shape.

According to another aspect of the present invention, a method of preparing a lithium secondary battery is provided. The method comprises preparing a lithium secondary battery by injecting a non-aqueous electrolyte comprising a lithium salt, a non-aqueous organic solvent, a phosphonate compound with an unsaturated hydrocarbon group, and a polymerization initiator between positive and negative electrodes; and preparing the linear polymer with P=O bonds by reacting the phosphonate compound with the unsaturated hydrocarbon group at room temperature (roughly 20° C.) or by heat-treatment.

The heat-treatment is preferably carried out from about 40 to about 90° C., and more preferably from about 40 to about 80° C. Through this heat-treatment, the phosphonate compound with an unsaturated hydrocarbon group is polymerized to form a linear polymer with P=O bonds.

The polymerization initiator that initiates polymerization of the phosphonate compound with the unsaturated hydrocarbon group may include azobisisobutyronitrile (AIBN), benzophenone (BPO), and a peroxide-based initiator such as dilauroyl peroxide, di(4-tert-butylcyclohexyl) peroxydicarbonate), t-amyl peroxyl 2-ethyl hexanoate, or other similar initiator known to those skilled in the art. The content of the polymerization initiator preferably ranges from about 0.1 to about 10 parts by weight based on 100 parts by weight of the phosphonate compound. A protective layer on the electrode is not formed significantly when the polymerization initiator is used in an amount of less than about 0.1 part by weight, and gases are generated from initiator decomposition when the compound is used in an amount exceeding about 10 parts by weight.

The present invention is further explained in more detail with reference to the following examples. These examples, however, should not in any sense be interpreted as limiting the scope of the present invention.

EXAMPLES AND COMPARATIVE EXAMPLES

Example 1

Ethylene carbonate/ethylmethyl carbonate/propylene carbonate/fluorobenzene (EC/EMC/PC/FB) were mixed in a volume ratio of 30:55:5:10 in order to prepare a non-aqueous organic solvent. 1.3M of $LiPF_6$ were added to the solvent, and 0.5 wt % of diethyl vinyl phosphonate based on the total weight of electrolyte and 1 part by weight of azobisisobutyronitrile based on 100 parts by weight of diethyl vinyl phosphonate were further added to prepare an electrolyte.

$LiCoO_2$ having an average particle diameter of 10 μm as a positive active material, Super P (acetylene black) as a conductive agent, and polyvinylidenefluoride (PVdF) as a binder were mixed in a weight ratio of 94:3:3 in N-methyl-2-pyrrolidone (NMP) to prepare a positive slurry. The slurry was coated on an aluminum foil, dried, and compressed by a roll press, thus manufacturing a positive electrode having a width of 4.9 cm and a thickness of 1.13 m. Mesocarbon fiber (MCF from PETOCA company) as a negative active material, oxalic acid, and PVdF as a binder were mixed in a weight ratio of 89.8:0.2:10 to prepare a negative slurry. The slurry was coated on a copper foil, dried, and compressed by a roll press, thus manufacturing a negative electrode having a width of 5.1 cm and a thickness of 117 μm. Between the manufactured positive and negative electrodes, a polyethylene porous film separator having a width of 5.3 cm and a thickness of 18 μm was interposed, followed by winding and placing into prismatic cans. 5.6 g of the electrolyte prepared as above were injected into the cans, thus fabricating the prismatic-type lithium secondary battery cell. The cell was placed for 24 hours to react diethyl vinyl phosphonate, resulting in formation of a linear polymer containing P=O bonds.

Example 2

Ethylene carbonate/ethylmethyl carbonate/propylene carbonate/fluorobenzene (EC/EMC/PC/FB) were mixed in a volume ratio of 30:55:5:10 in order to prepare a non-aqueous organic solvent. 1.3M of $LiPF_6$ were added to the solvent, and 0.5 wt % of diethyl vinyl phosphonate based on the total weight of electrolyte and 2.7 part by weight of azobisisobutyronitrile based on 100 parts by weight of diethyl vinyl phosphonate were further added to prepare an electrolyte.

Between positive and negative electrodes manufactured in the same manner as in Example 1, a polyethylene porous film separator having a width of 5.3 cm and a thickness of 18 μm was interposed, followed by winding and placing into prismatic cans. 2.2 g of the electrolyte prepared as above were injected into the cans, thus fabricating the prismatic-type lithium secondary battery cell. The cell was placed in an oven at a temperature of 75° C. for 4 hours to react diethyl vinyl phosphonate, resulting in formation of a linear polymer containing P=O bonds.

Example 3

Ethylene carbonate/ethylmethyl carbonate/propylene carbonate/fluorobenzene (EC/EMC/PC/FB) were mixed in a volume ratio of 30:55:5:10 in order to prepare a non-aqueous organic solvent. 1.3M of LiPF$_6$ were added to the solvent, and 0.5 wt % of ethylene glycol methacrylate phosphate based on the total weight of electrolyte and 2.7 parts by weight of azobisisobutyronitrile based on 100 parts by weight of ethylene glycol methacrylate phosphate were further added to prepare an electrolyte.

Between positive and negative electrodes manufactured in the same manner as in Example 1, a polyethylene porous film separator having a width of 5.3 cm and a thickness of 18 μm was interposed, followed by winding and placing into prismatic cans. 2.2 g of the electrolyte prepared as above were injected into the cans, thus fabricating the prismatic-type lithium secondary battery cell. The cell was placed in an oven at a temperature of 75° C. for 4 hours to react diethyl vinyl phosphonate, resulting in formation of a linear polymer containing P=O bonds.

Comparative Example 1

A lithium secondary battery cell was prepared in the same manner as in Example 1, except that 1.3 M of LiPF$_6$ were added to a mixed solvent of ethylene carbonate (EC)/ethyl methyl carbonate (EMC)/propylene carbonate (PC)/fluorobenzene (FB) in a volume ratio of 30:55:5:10 to prepare a composition to form an electrolyte.

In order to evaluate the swelling inhibition properties of the prismatic lithium secondary battery cells of Examples and Comparative Example 1, Examples 1, 2, and Comparative Example 1 were charged and discharged at 0.2° C. at a voltage of 0 to 4.2V for formation of the batteries, and then charged and discharged at 0.5° C. After the batteries were placed in a high temperature oven at 90° C. for 4 hours and 48 hours respectively, the thickness of the cells was measured. The measurement results of Examples 1 to 3, and Comparative Example 1 are shown in Table 1. The data of Table 1 are average values of three cells.

TABLE 1

|  |  | Example 1 | Example 2 | Example 3 | Comparative Example 1 |
|---|---|---|---|---|---|
| Thickness of batteries (mm) | Initial time | 3.84 | 3.83 | 3.83 | 3.83 |
|  | After 4 hours | 4.78 | 4.27 | 4.32 | 5.11 |
|  | After 48 hours | 7.81 | 6.90 | 6.68 | 9.87 |

As shown in Table 1, the swelling inhibition properties of the cells according to Examples 1 to 3 were improved over that of the cell of Comparative Example 1.

The lithium secondary battery cells have good swelling inhibition properties and flame-retardant properties, resulting in improvement of safety.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A lithium secondary battery, comprising:
a positive electrode including a material that is capable of reversible intercalation/deintercalation of lithium ions as a positive active material;
a negative electrode including a lithium metal, a lithium-containing alloy, a material that is capable of reversible intercalation/deintercalation of lithium ions as a negative active material or a material that is capable of reversibly forming a lithium-containing compound;
a separator interposed between the positive and negative electrodes; and
an electrolyte on the separator, wherein the electrolyte includes a non-aqueous organic solvent, a lithium salt, and a linear polymer having P=O bonds,
wherein the linear polymer having P=O bonds is present in an amount ranging from about 0.005 to less than 5 wt % based on the total amount of the electrolyte,
wherein the non-aqueous organic solvent comprises a mixed solvent of a carbonate solvent and an aromatic hydrocarbon solvent,
wherein the aromatic hydrocarbon solvent is at least one selected from the group consisting of fluorobenzene, fluorotoluene, trifluorotoluene, and a compound of Formula (1):

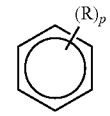

where R is a halogen, or a $C_1$ to $C_{10}$ alkyl, and p is an integer of 1 to 6,
wherein the linear polymer having P=O bonds is formed of a polymerized phosphonate compound with a polymerizable functional unsaturated hydrocarbon group, and
wherein the phosphonate compound with the unsaturated hydrocarbon group is at least one selected from the group consisting of allyl diethylphosphonoacetate $(C_2H_5O)_2P(O)CH_2CO_2CH_2CH=CH_2)$, triethyl 3-methyl-4-phosphonocrotonate $(C_2H_5O)_2P(O)CH_2C(CH_3)=CHCO_2C_2H_5)$, and allyl tetraisopropylphosphonodiamidite $([[CH_3)_2CH]_2N]_2POCH_2CH=CH_2)$.

2. The lithium secondary battery according to claim 1, wherein the carbonate is selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

3. The lithium secondary battery according to claim 1, wherein the carbonate solvent comprises a mixed solvent of a cyclic carbonate and a linear carbonate.

4. The lithium secondary battery according to claim 1, wherein the carbonate solvent and the aromatic hydrocarbon solvent are mixed in a volume ratio ranging from about 1:1 to about 30:1 carbonate solvent to aromatic hydrocarbon solvent.

5. The lithium secondary battery according to claim 1, wherein the lithium salt is at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

6. The lithium secondary battery according to claim 5, wherein the lithium salt is used in a concentration ranging from about 0.6 to about 2.0 M.

7. A method of manufacturing a lithium secondary battery, comprising: preparing a lithium secondary battery by injecting a non-aqueous electrolyte comprising a lithium salt, a non-aqueous organic solvent, a phosphonate compound with an unsaturated hydrocarbon group, and a polymerization initiator between positive and negative electrodes; and reacting the phosphonate compound with the unsaturated hydrocarbon group to prepare a linear polymer with P=O bonds, wherein the phosphonate compound with the unsaturated hydrocarbon group is at least one selected from the group consisting of allyl diethylphosphonoacetate $(C_2H_5O)_2P(O)CH_2CO_2CH_2CH=CH_2$), triethyl 3-methyl-4-phosphonocrotonate $(C_2H_5O)_2P(O)CH_2C(CH_3)=CHCO_2C_2H_5$), and allyl tetraisopropylphosphonodiamidite $([[(CH_3)_2CH]_2N]_2POCH_2CH=CH_2$).

8. The method according to claim 7, wherein the method further comprises heat-treating the manufactured lithium secondary battery.

* * * * *